United States Patent
Jiang et al.

(10) Patent No.: US 12,517,882 B2
(45) Date of Patent: Jan. 6, 2026

(54) BUILDING AND USING SCALABLE DATABASE INDEXES

(71) Applicant: INTERNATIONAL BUSINESS MACHINES CORPORATION, Armonk, NY (US)

(72) Inventors: Peng Hui Jiang, Beijing (CN); Sheng Yan Sun, Beijing (CN); Xiao Xiao Chen, Beijing (CN); Ying Zhang, Beijing (CN); Xiao Yi Tian, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 11 days.

(21) Appl. No.: 18/057,371

(22) Filed: Nov. 21, 2022

(65) Prior Publication Data

US 2024/0168935 A1 May 23, 2024

(51) Int. Cl.
 *G06F 16/22* (2019.01)
 *G06F 11/34* (2006.01)
 *G06F 16/27* (2019.01)

(52) U.S. Cl.
 CPC ...... *G06F 16/2272* (2019.01); *G06F 11/3409* (2013.01); *G06F 16/27* (2019.01)

(58) Field of Classification Search
 CPC .............................. G06F 16/2272; G06F 16/27
 See application file for complete search history.

(56) References Cited

U.S. PATENT DOCUMENTS

| | | |
|---|---|---|
| 10,860,556 B2 | 12/2020 | Oks et al. |
| 2009/0265306 A1 | 10/2009 | Barsness et al. |
| 2016/0292171 A1 | 10/2016 | Bhagat et al. |
| 2020/0134085 A1 | 4/2020 | Liu et al. |
| 2020/0201879 A1* | 6/2020 | Leskes ................ G06F 3/065 |
| 2020/0320051 A1 | 10/2020 | Lee et al. |
| 2023/0020330 A1* | 1/2023 | Schwerin ............ G06F 16/256 |
| 2023/0273940 A1* | 8/2023 | Shu .................. G06F 16/24556 707/600 |

OTHER PUBLICATIONS

Wei, Bizhong, et al. "An Optimization Method for Elasticsearch Index Shard Number." 2020 16th International Conference on Computational Intelligence and Security (CIS). IEEE, 2020. (Year: 2020).*

Kathare, Nikita, O. Vinati Reddy, and Vishalakshi Prabhu. "A comprehensive study of Elasticsearch." International Journal of Science and Research (IJSR) (2020). (Year: 2020).*

(Continued)

*Primary Examiner* — Brittany N Allen
(74) *Attorney, Agent, or Firm* — Lily Neff, Esq; Kevin P. Radigan, Esq.; Heslin Rothenberg Farley & Mesiti P.C.

(57) ABSTRACT

Access usage of one or more shards of a set of shards of a database is determined. The set of shards includes a plurality of shards including a primary shard and one or more replica shards of the primary shard. A shard of the plurality of shards is selected based on the access usage, and a set of indexes is built for the shard that is selected. The set of indexes built for the shard that is selected is used for at least multiple shards of the plurality of shards.

19 Claims, 12 Drawing Sheets

(56) References Cited

OTHER PUBLICATIONS

Baker et al., Megastore: Providing Scalable, Highly Available Storage for Interactive Services, Proceedings of the Conference on Innovative Data system Research (CIDR) (2011), pp. 223-234. (Year: 2011).*

Elastic Docs, Elasticsearch guide [7.17], Search your data, Sep. 2, 2022, https://www.elastic.co/guide/en/elasticsearch/reference/7.17/search-shard-routing.html (Year: 2022).*

Unknown, "Data Distribution with MariaDB Xpand," https://mariadb.com/docs/architecture/components/xpand/data-distribution, downloaded from internet Sep. 8, 2022, pp. 1-15.

Bhola, Sumeer, "How We Built Scalable Spatial Data & Spatial Indexing in CockroachDB," Dec. 9, 2020, pp. 1-18.

Kondylakis, Haridimos et al., "Coconut: a Scalable Bottom-Up Approach for Building Data Series Index," Proceedings of the VLDB Endowment, vol. 11, No. 6, Aug. 2018, pp. 677-690.

\* cited by examiner

BUILDING AND USING SCALABLE DATABASE INDEXES

BACKGROUND

One or more aspects relate, in general, to facilitating processing within a computing environment, and in particular, to improving such processing, as it relates to databases.

Databases are used to store data. The data is stored, for example, in tables and one or more database indexes are used to improve retrieval of the data from the tables. The data may be replicated from one computer to one or more other computers to improve accessibility of the data. To perform replication, a database replication technique is used. Example replication techniques include multi-primary replication and primary-secondary replication.

Multi-primary replication allows data to be stored by a group of computers and updated by any member of the group. The multi-primary replication system is responsible for propagating data modifications made by each member to the rest of the group and resolving any conflicts that might arise between concurrent changes made by different members.

In a multi-primary configuration, the machines can work as both primary and replicas. The multi-primary configuration may be thought of as a circle of machines, e.g., A-B-C-D-A. B can replicate data from A; C can replicate data from B; D can replicate data from C; and A can replicate data from D. Data may be written to any node, and a query may be broadcast to all nodes. The nodes have a same database schema, including a same set of tables, indexes, etc.

In a primary-secondary configuration, there is a primary (source) and one or more secondaries (replicas). The primary executes transactions, commits them and then they are later (thus asynchronously) sent to the secondaries to be either re-executed or applied.

With either configuration, primary data is to have high availability. Thus, the data is replicated using a replication technique. However, a replication of large amounts of data results in a high cost of building secondary indexes to be used to facilitate retrieval of the replicated data.

SUMMARY

Shortcomings of the prior art are overcome, and additional advantages are provided through the provision of a computer-implemented method of facilitating processing within a computing environment. The computer-implemented method includes determining access usage of one or more shards of a set of shards of a database. The set of shards includes a plurality of shards including a primary shard and one or more replica shards of the primary shard. A shard of the plurality of shards is selected based on the access usage, and a set of indexes is built for the shard that is selected. The set of indexes built for the shard that is selected is used for at least multiple shards of the plurality of shards.

Computer systems and computer program products relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
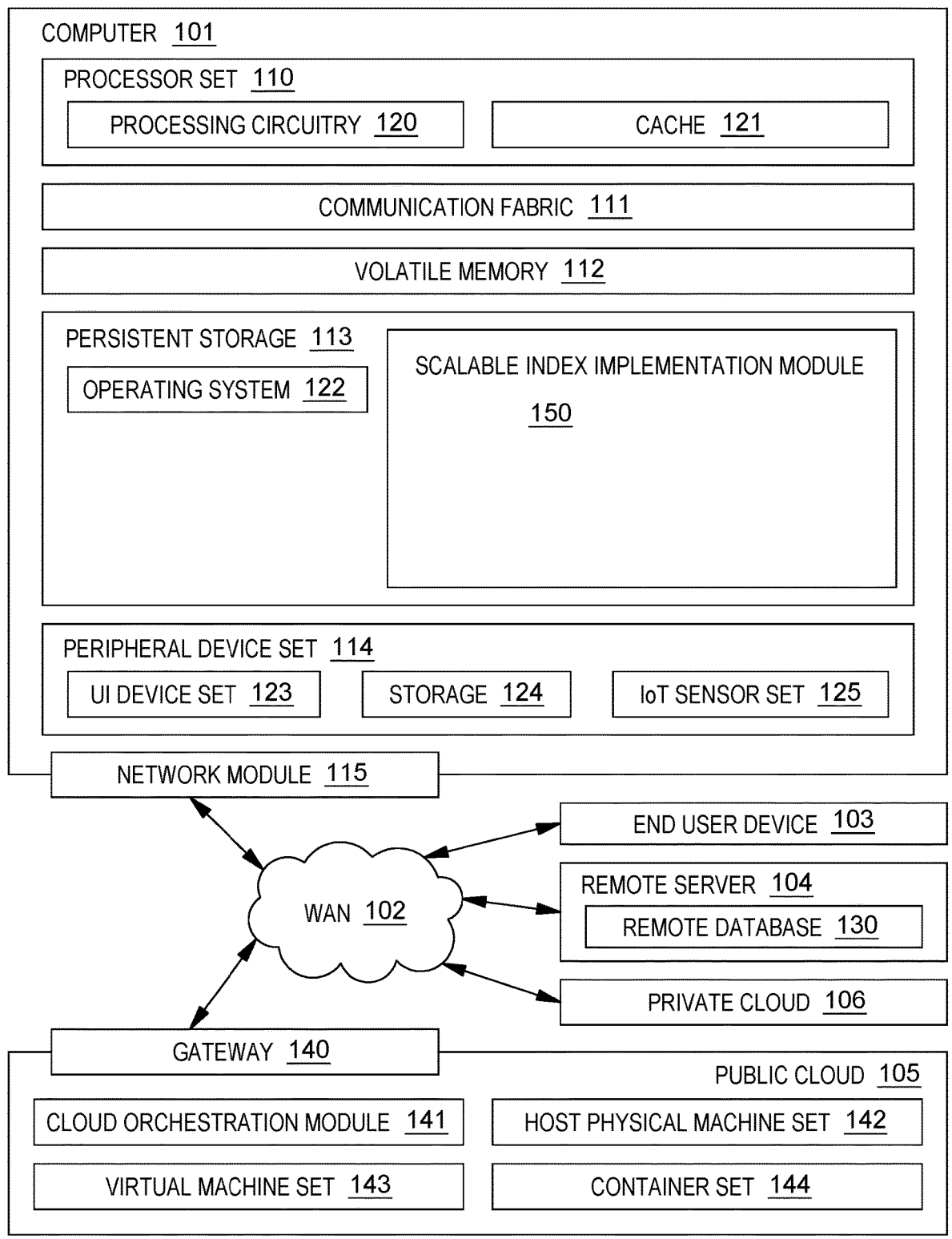
FIG. 1 depicts one example of a computing environment to perform, include and/or use one or more aspects of the present invention.

In one or more aspects, a capability to implement (e.g., build and use) scalable indexes to be used with multi-primary and/or primary-secondary database architectures is provided. In one or more aspects, a database is replicated using either multi-primary or primary-secondary replication. With such replication, database shards (e.g., portions, such as horizontal slices of the data) are copied onto secondary nodes, providing primary shards of a database on one or more primary nodes and replica (e.g., replica primary or secondary) shards of the database on one or more secondary nodes. A node may have both primary and/or replica shards of a database (or databases).

To facilitate access to the shard data, database indexes (also referred to herein as indexes) are used. Typically, each of a primary shard and its replicas (e.g., replica primary shards or secondary shards) has a set of indexes associated therewith. A set of indexes has one or more indexes for one or more database records of a shard. The set of indexes for a replica shard has the same content as the set of indexes for its primary shard. Thus, in one example, each shard copy of an identified shard, in which a shard copy is an identified primary shard (e.g., primary shard n) or a replica (e.g., replica primary or secondary) shard of the identified primary shard (e.g., a replica of primary shard n), has a set of indexes used to access data of the respective shard. For instance, primary shard 1 has a set of indexes, as well as each replica of shard 1.

However, in accordance with an aspect of the present invention, instead of defining and building a set of indexes for each shard copy, a selection is made of one or more of the shard copies (but less than all shard copies of an identified shard) and one or more sets of indexes are built for those selected one or more shard copies. As an example, for a set of shard copies (e.g., an identified primary and its replicas; also referred to herein as a set of shards), the primary shard is selected, and a set of indexes is built for the primary shard. That set of indexes is then used by the primary shard and its replica shards. In another example, for the set of shard copies, one of the replica shards is selected, and a set of indexes is built for the replica shard. That set of indexes is then used by the primary shard and its replica shards. In another example, one or more shard copies (but less than all) may be selected (e.g., a primary shard and a replica shard; multiple replica shards; etc.) and one or more sets of indexes are built and used by the shard copies.

In one example, the selection is based on one or more predefined selection criteria, such as access usage, examples of which include, for instance, one or more of access frequency, usage patterns, access paths, distribution trends and/or other access usage. As examples, one or more shard copies of a set of shards that are accessed more frequently based on a comparison with the other shard copies of the set of shards and/or have a predefined relationship with a threshold (e.g., greater than and/or equal to the threshold; being within a particular threshold range; etc.) are selected. As another example, a shard of a set of shards determined to have hot access (e.g., a certain amount of access (as predefined) in a selected time period) is selected. In further examples, selection is based on which user is using which shard copy the most or how the shard copy is being used. Additional and/or other examples and/or selection criteria may be used.

Further, in one or more aspects, indexes may be built for a portion of a shard. For instance, if a particular shard has skewed data (e.g., skewed to the left or right), one or more indexes may be built for the skewed data of the shard. In one example, indexes for skewed data are maintained in one area (e.g., on a particular node, etc.).

One or more aspects of the present invention are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., implements scalable indexes and/or performs one or more other aspects of the present invention. Aspects of the present invention are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 1. In one example, a computing environment 100 contains an example of an environment for the execution of at least some of the computer code involved in performing the inventive methods, such as scalable index implementation code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future.

In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. For instance, in one or more embodiments, one or more of the components/modules of FIG. 1 are not included in the computing environment and/or are not used for one or more aspects of the present invention. Further, in one or more embodiments, additional and/or other components/modules may be used. Other variations are possible.

Figure 2:
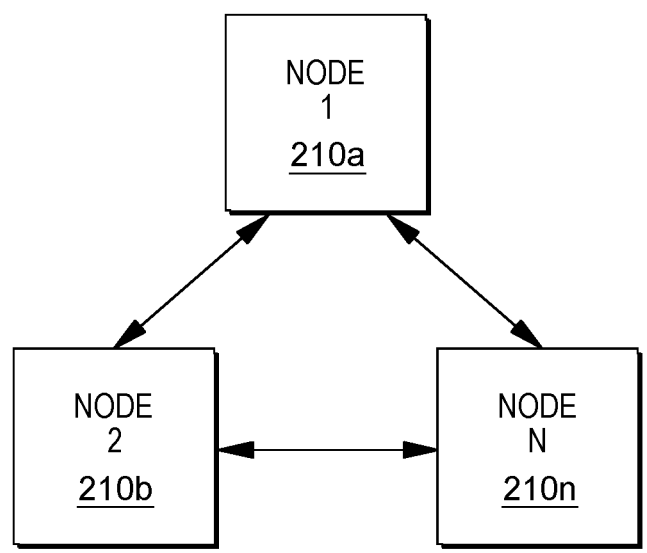
FIG. 2 depicts one example of a cluster of nodes, in accordance with one or more aspects of the present invention.

In one example, one or more computers (e.g., computer 101) and/or servers (e.g., remote server 104) are nodes of a cluster of nodes. As shown in FIG. 2, a cluster of nodes 200 includes a plurality of nodes 210a-210n which communicate with one another to perform one or more operations. In one example, the cluster of nodes is a cluster of database nodes that connect to one or more databases and perform different operations (e.g., update, delete, insert, query) on the databases. A cluster of nodes may include additional, fewer and/or other nodes than described herein. Further, although example nodes are mentioned herein, additional, fewer and/or other computers, servers and/or other computing devices may be nodes in the cluster of nodes. Many examples and/or configurations are possible.

Figure 3:
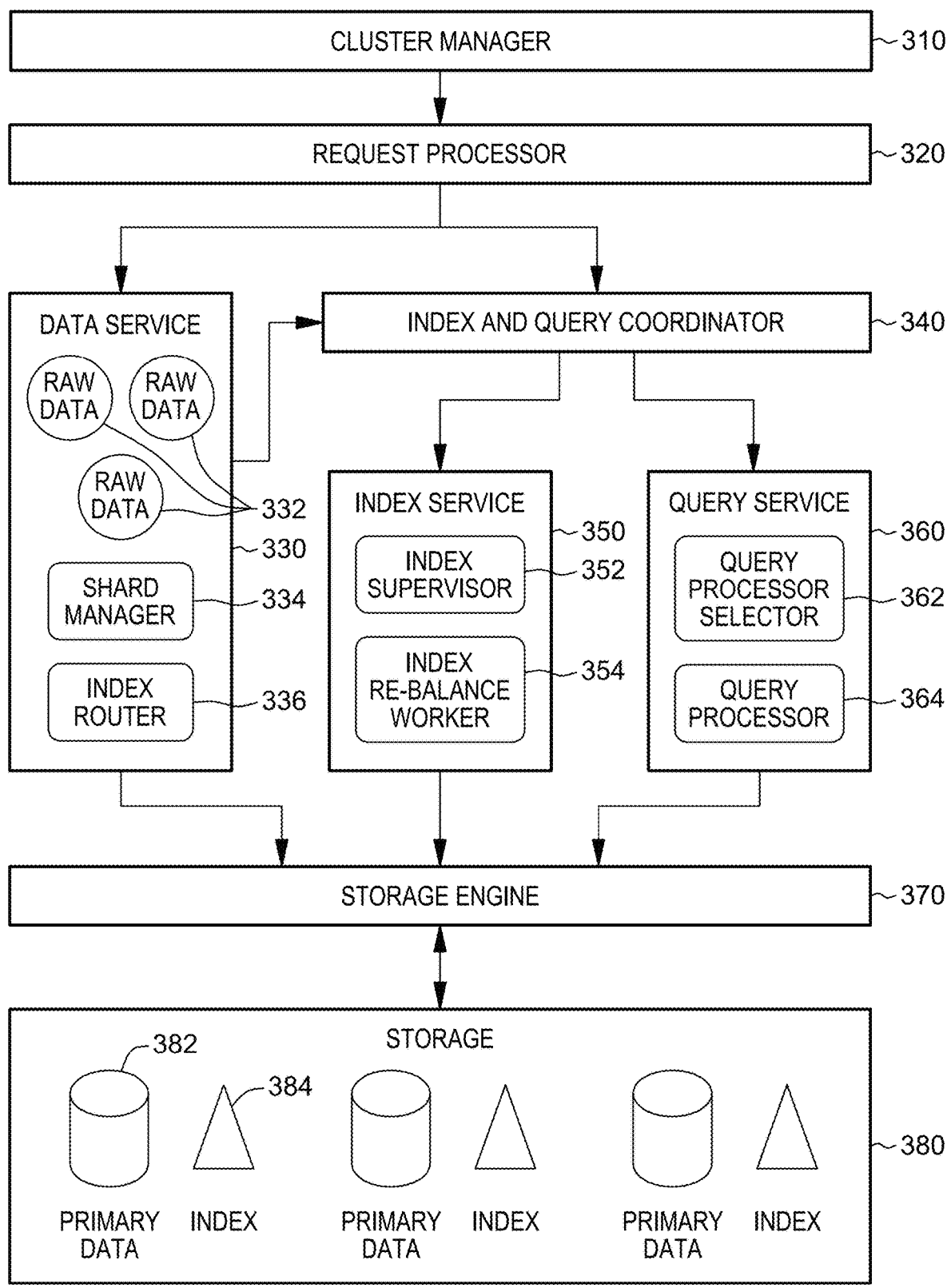
FIG. 3 depicts one example of further details of a node incorporating and using one or more aspects of the present invention.

A cluster of nodes, such as cluster 200, is managed, for instance, by a cluster manager. One example of a cluster manager is depicted in FIG. 3. Referring to FIG. 3, a cluster manager 310 manages coordination across the nodes of a cluster (e.g., cluster 200). In one example, cluster manager 310 is coupled to a request processor 320 of a node that responds to requests from applications or clients for access to primary data 382 and indexes 384 in storage 380 (e.g., storage 124, persistent storage 113, and/or other storage).

Request processor 320 is further coupled to a data service 330 and an index and query coordinator 340. In one example, data service 330 and index and query coordinator 340 may be part of a database engine. The database engine may be part of or coupled to a storage engine 370, which is coupled to a storage (e.g., storage 380). In one example, storage engine 370 manages the storage of data in each node. Request processor 320, data service 330, index and query coordinator 340 and storage engine 370 may be included in one node (or multiple nodes).

In one example, data service 330 is responsible for the core data storage and is used to optimize core data operations. Data service 330 includes, for instance, raw data 332 (e.g., original data) to be stored in one or more databases and a shard manager 334 to manage database shards. A database shard is a portion of data in a database. As an example, it is a horizontal partition or slice of data in a database. Data service 330 further includes an index router 336 to route an index request to index and query coordinator 340. The index request is a request to update one or more database indexes based on updating the database (e.g., with raw data 332).

Index and query coordinator 340 is responsible for coordinating the workload of an index service 350 and a query service 360 in multiple nodes and their shards. Index service 350 manages the workload to keep the index fresh including, in accordance with one or more aspects, selecting a proper shard of a set of shards for which an index is to be built, instead of indexing all shards of the set of shards, and re-balancing a distribution of indexes according to, e.g., usage access (e.g., primary data distribution trends, access frequency, access paths and/or query patterns, as examples). In one example, index service 350 includes an index supervisor 352 to be used to, e.g., select shards for which indexes are to be built, and an index re-balance worker 354 to be used to, e.g., build and/or redistribute indexes (e.g., build an index, add an index, remove an index, etc.). Index service 350 may include additional, fewer and/or different components.

Query service 360 is responsible for the execution of database queries, including parsing, optimizing and executing the queries to completion. In one example, query service 360 includes a query processor selector 362 to, e.g., select a processor(s) to perform queries, and at least one query processor 364 to, e.g., perform queries. Query service 360 may include additional, fewer and/or different components.

In one or more aspects, query processor 364 analyzes query accesses to determine the databases, and in particular, the shards within the databases, being accessed. This information is used to, e.g., implement indexes for selected shards based on, e.g., access usage, such as access frequency. This processing is further described below.

In one example, to implement scalable indexes, a scalable index implementation module (e.g., scalable index implementation module 150) is used, in accordance with one or more aspects of the present invention. A scalable index is an index that is selectively built for a shard copy (e.g., a primary shard or a replica of the primary) based on, for instance, access usage (e.g., shard distribution, access frequency, access paths and/or access patterns, etc.). Thus, in accordance with one or more aspects, not all shard copies have indexes built for them; instead, a shard copy may access an index built for another shard copy. An index may be accessed by multiple shard copies, while another index may be accessed by one shard copy. Many variations are possible.

A scalable index implementation module (e.g., scalable index implementation module 150) includes code or instructions used to implement (e.g., build and use) one or more scalable indexes, in accordance with one or more aspects of the present invention. A scalable index implementation module (e.g., scalable index implementation module 150) includes, in one example, various sub-modules to be used to perform the processing. The sub-modules are, e.g., computer readable program code (e.g., instructions) in computer readable media, e.g., storage (storage 124, persistent storage 113, cache 121, other storage, as examples). The computer readable media may be part of a computer program product and may be executed by and/or using one or more computers, such as computer(s) 101; servers, such as server(s) 104; processors, such as a processor of processor set 110; and/or processing circuitry, such as processing circuitry of processor set 110; etc. Additional and/or other computers, servers, processors, and/or processing circuitry may be used to execute one or more of the sub-modules and/or portions thereof. Many examples are possible.

Figure 4:
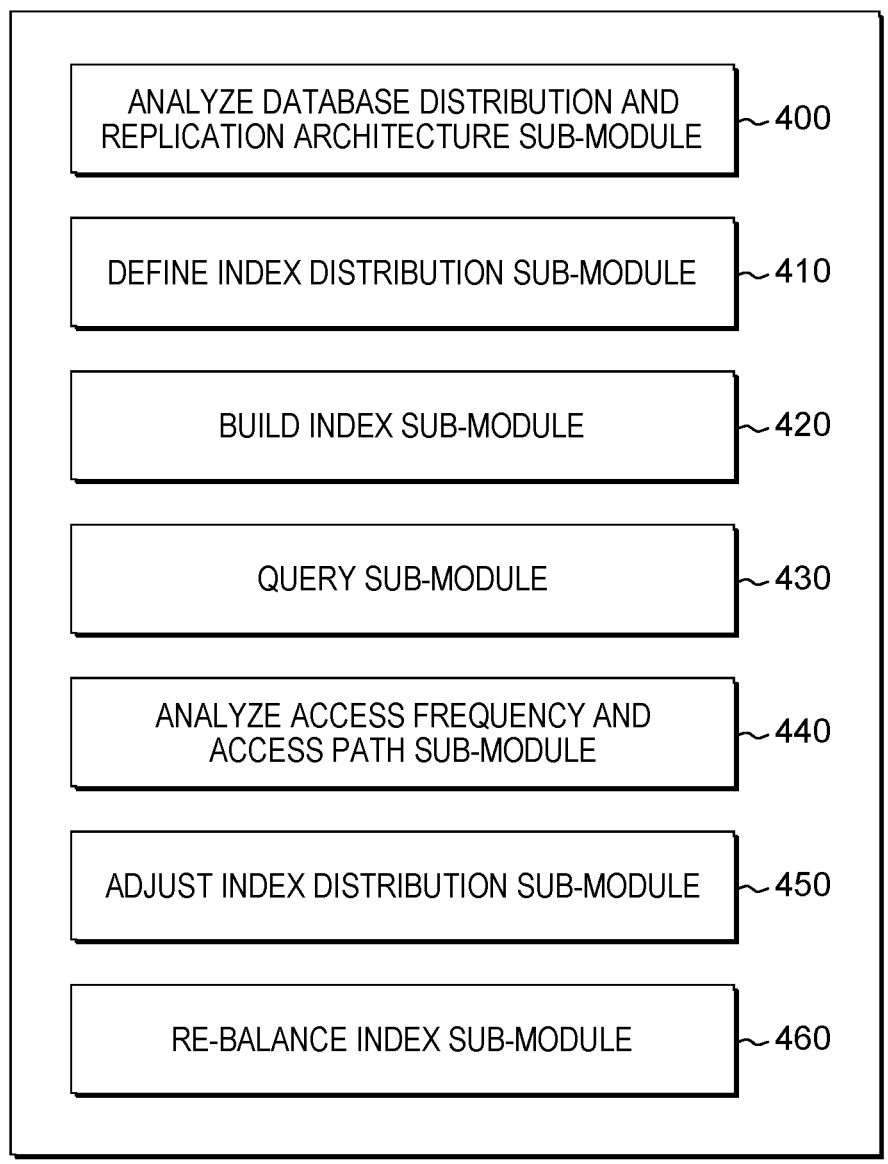
FIG. 4 depicts one example of sub-modules of a scalable index implementation module of FIG. 1, in accordance with one or more aspects of the present invention.

One example of scalable index implementation module 150 is described with reference to FIG. 4. In one example, scalable index implementation module 150 includes an analyze database distribution and replication architecture sub-module 400 to analyze the database distribution and determine information regarding the replication architecture; a define index distribution sub-module 410 to build an index distribution for multiple database nodes—the index distribution defines, for instance, which shard copies (or shards of a set of shards) are to have indexes built; a build index sub-module 420 to build one or more sets of indexes for one or more selected shards; a query sub-module 430 to perform database queries; an analyze access frequency and access path sub-module 440 to analyze the access frequency and/or access paths (e.g., one or more query paths of a query) of each kind of query and each primary database; an adjust index distribution sub-module 450 to adjust the index distribution for each shard (or one or more shards) in a database node; and a re-balancing index sub-module 460 to re-balance an index according to, e.g., access usage. Although various sub-modules are described, a scalable index implementation module, such as scalable index implementation module 150, may include additional, fewer and/or different sub-modules. A particular sub-module may include additional code, including code of other sub-modules, less code, and/or different code. Further, additional and/or other modules may be used to implement a scalable index. Many variations are possible.

The sub-modules are used, in accordance with one or more aspects of the present invention, to implement a scalable index, as further described with reference to FIG. 5. In one example, a scalable index implementation process is executed by one or more of a computer (e.g., computer 101, other computer(s), etc.), a server (e.g., server 104, other server(s)), a processor and/or processing circuitry (e.g., of processor set 110 or other processor sets), etc. Although example computers, servers, processors and/or processing circuitry are provided, additional, fewer and/or other computers, servers, processors and/or processing circuitry may be used for the scalable index implementation process. Various options are possible.

Figure 5:
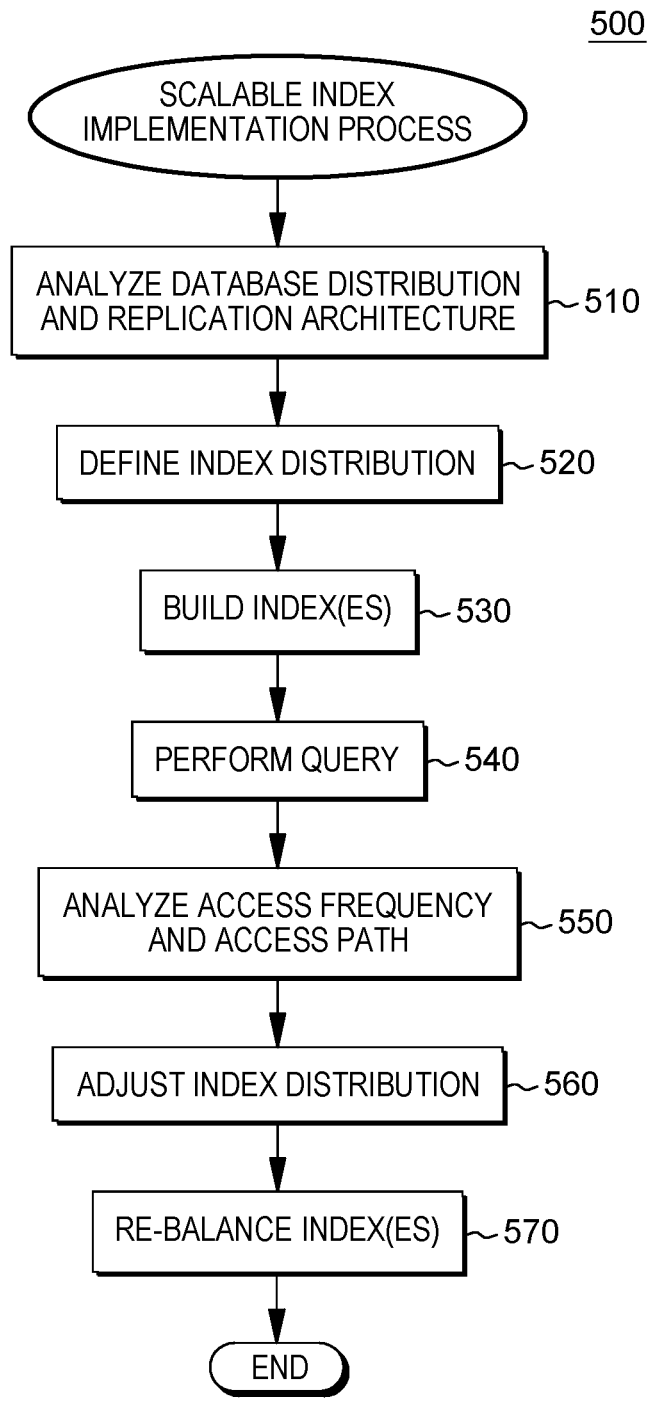
FIG. 5 depicts one example of scalable index implementation processing, in accordance with one or more aspects of the present invention.

Referring to FIG. 5, in one example, a scalable index implementation process 500 analyzes 510 a distribution of a database and a replication architecture to be used to replicate the database to obtain an understanding of the database and how it is replicated. For instance, determinations are made as to the distribution of the database, such as where the shards are located (e.g., which nodes) and of a replication mapping each shard. Further, in one example, a determination is made as to the type of replication architecture. For instance, a determination is made as to whether it is a multi-primary configuration, a primary-secondary configuration or other type of configuration.

Further, based on, at least, a part of the analysis, process 500 defines 520 an index distribution for one or more database nodes. For instance, for a multi-primary shard distribution with multiple primary copies, indexes are distributed on the nodes based on the primary shards to which the indexes apply. In one example, a mapping of the indexes on the nodes is maintained. Moreover, in one or more aspects, the index distribution indicates for which shard copies an index (e.g., set of indexes) is to be built. The shard copies for which an index is to be built are selected based on one or more predefined criteria. For instance, they are selected based on access usage (e.g., shard distribution, access frequency, access paths, and/or access patterns, etc.). The access usage may be determined based on, e.g., tracking, for instance, the accesses, access requests, queries, etc. In one example, selection may be based on one selection criterion (e.g., shard distribution, primary shards, etc.) and then further based on another selection criteria (e.g., access frequency). Other tracking and/or selection criteria may be used. Further, in one or more examples, access usage may be predicted based on, e.g., estimation (e.g., particularly if usage data is unavailable or limited), previous analysis, learned information, etc. Many examples are possible.

In one example, process 500 builds 530 indexes for the selected shard copies. In one example, the indexes are built based on the index distribution. In another example, the shard copy selection is performed by the building process, instead of and/or in addition to the define index distribution process. Various options are possible.

As indicated, in accordance with one or more aspects, instead of building indexes (e.g., a set of indexes) for each shard copy (a primary shard and each replica), indexes (e.g., sets of indexes) are built for one or more selected shard copies (or selected shards of a set of shards). The selection of the one or more shard copies is based on predefined criteria, such as access usage (e.g., one or more of access frequency, access patterns, access paths, distribution trends, etc.). For example, if the predefined criteria is access frequency, then indexes are built for the one or more shard copies accessed frequently (or predicted to be accessed frequently); however, for those shard copies not considered to be accessed frequently, the building of the indexes is omitted. To determine those shard copies that are accessed frequently, one or more techniques may be used. For instance, a comparison is performed of the access frequencies of the shard copies, and a number of those (as prespecified, e.g., one or more but less than all) with the highest access frequencies is selected. As another example, a shard copy that has an access frequency that has a predefined relationship with a threshold (e.g., greater than and/or equal to the threshold; being within a particular threshold range; etc.) is selected. As another example, shard copies with hot access frequencies may be selected. Other techniques may be used for determining access frequency and/or other access usage criteria.

Moreover, for skewed data, an index can be extended across nodes to allow even distribution. The tail may be added to a specific area for indexing and searching, and each skewed data query is directed to that area, which may be at a different node than the node issuing the query.

In one or more aspects, for each selected shard copy, an index (e.g., sets of indexes) is built to have one or more index sets for the same shard. If there are multiple index sets for a shard, each redundant portion has the same content. In one example, building an index includes building the index for the selected shard copy, moving the index from another shard copy to the selected shard copy (thereby, removing the index from the other shard copy and adding it to the selected shard copy) or using an index previously built for the shard copy, as examples.

Further, in one example, process 500 performs 540 query processing. For instance, a query request is accepted from one of multiple primary databases and the search is redirected to a replication set in multiple database sets. The replicas are used to respond to the query. In one example, a scatter and gather search result is provided for the search request. That is, multiple recipients (e.g., replicas) receive the query request and provide results and those results are aggregated to provide a single message back to the requestor.

In one example, process 500 analyzes 550 the access usage of the database and in particular, the shards of a set of shards (primary and replicas). For instance, process 500 analyzes query requests (e.g., access frequency, access patterns and/or access paths) of each kind of query and each primary database. Based thereon, in one example, process 500 adjusts 560 an index distribution for each shard in the one or more database nodes. For instance, it is determined that for particular shard copy, a set of indexes is to be built or that for a particular shard copy, a set of indexes is not to be built, and thus, the previously defined index distribution is adjusted to reflect the changes.

Further, in one example, process 500 re-balances 570 the sets of indexes according to, e.g., the adjusted index distribution and/or the analyzed access usage, such as primary data distribution trends, access frequency, access paths and/or query patterns, as examples. For instance, based on the access frequency, one or more sets of indexes may be built (e.g., built, moved, use of previously built index, etc.). As described herein, to determine those shard copies that are accessed frequently, one or more techniques may be used. For instance, a comparison is performed of the access frequencies of the shard copies, and a number of those (as prespecified, e.g., one or more but less than all) with the highest access frequencies is selected. As another example, a shard copy that has an access frequency that has a predefined relationship with a threshold (e.g., greater than and/or equal to the threshold; being within a particular threshold range; etc.) is selected. As another example, shard copies with hot access frequencies may be selected. Other techniques may be used and/or other predefined criteria.

Figure 6:
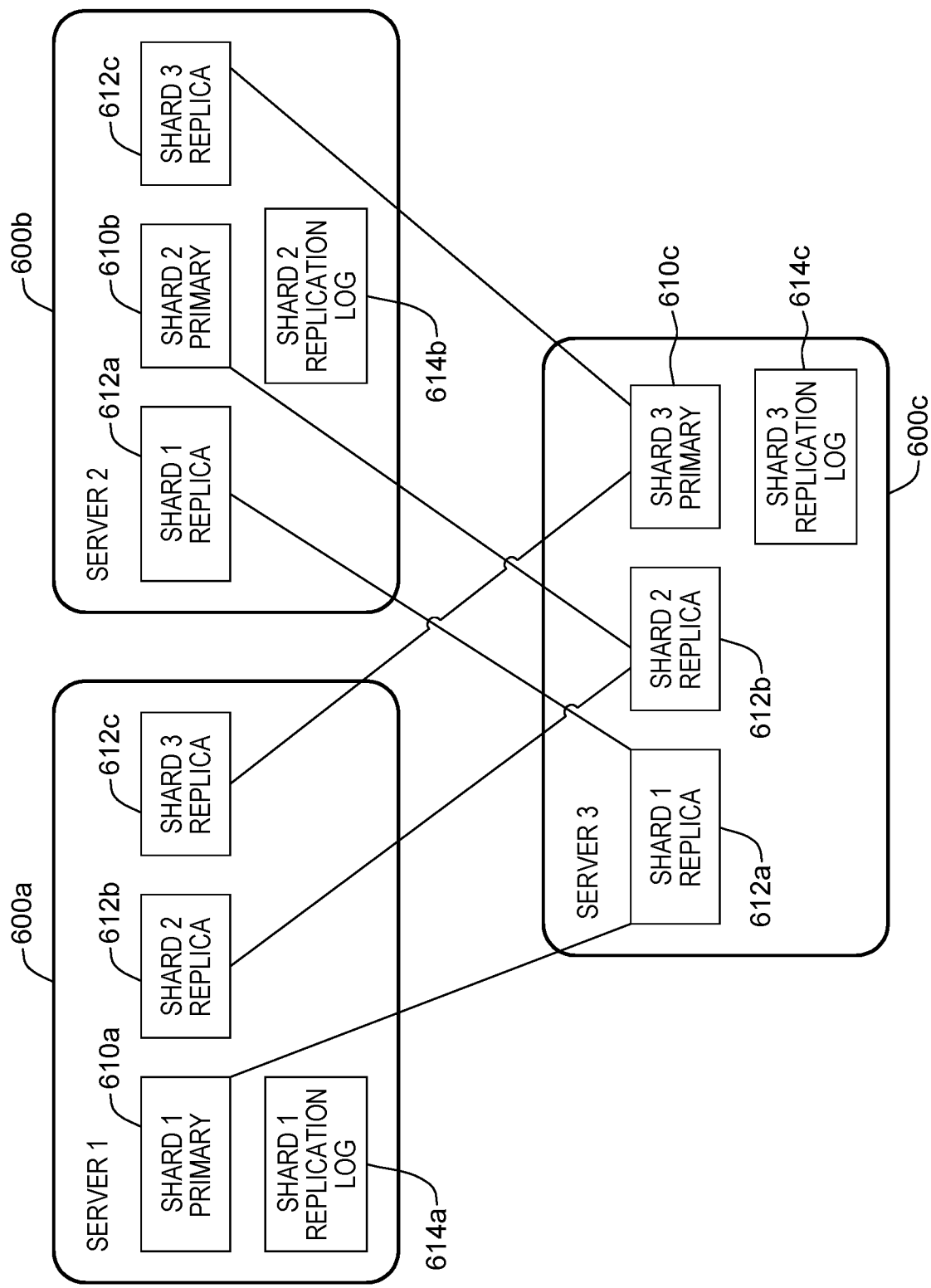
FIG. 6 depicts one example of shard replication, in accordance with one or more aspects of the present invention.
Figure 7:
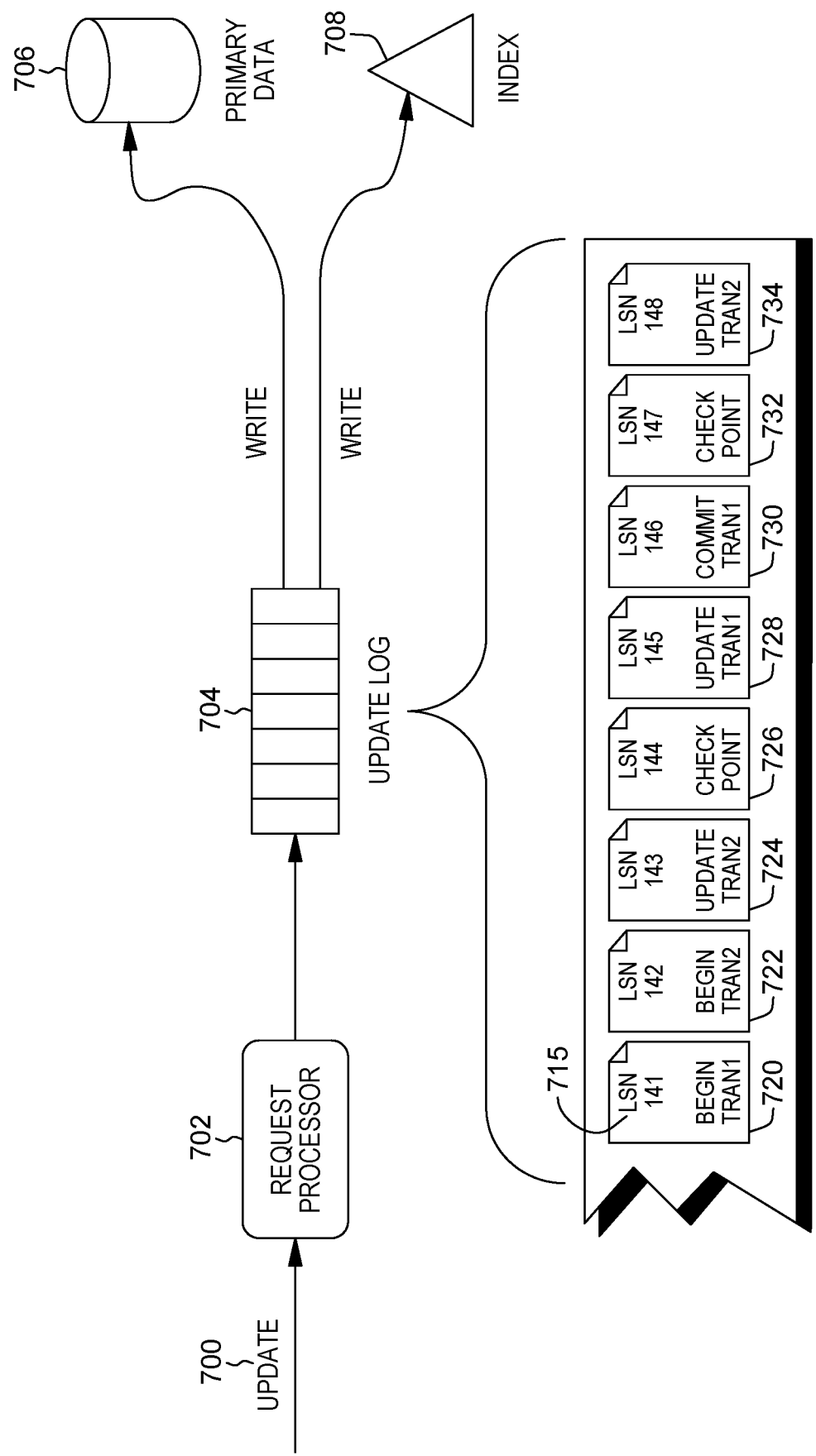
FIG. 7 depicts one example of using a log to record changes to a database and to update primary data and an associated index, in accordance with one or more aspects of the present invention.
Figure 8:
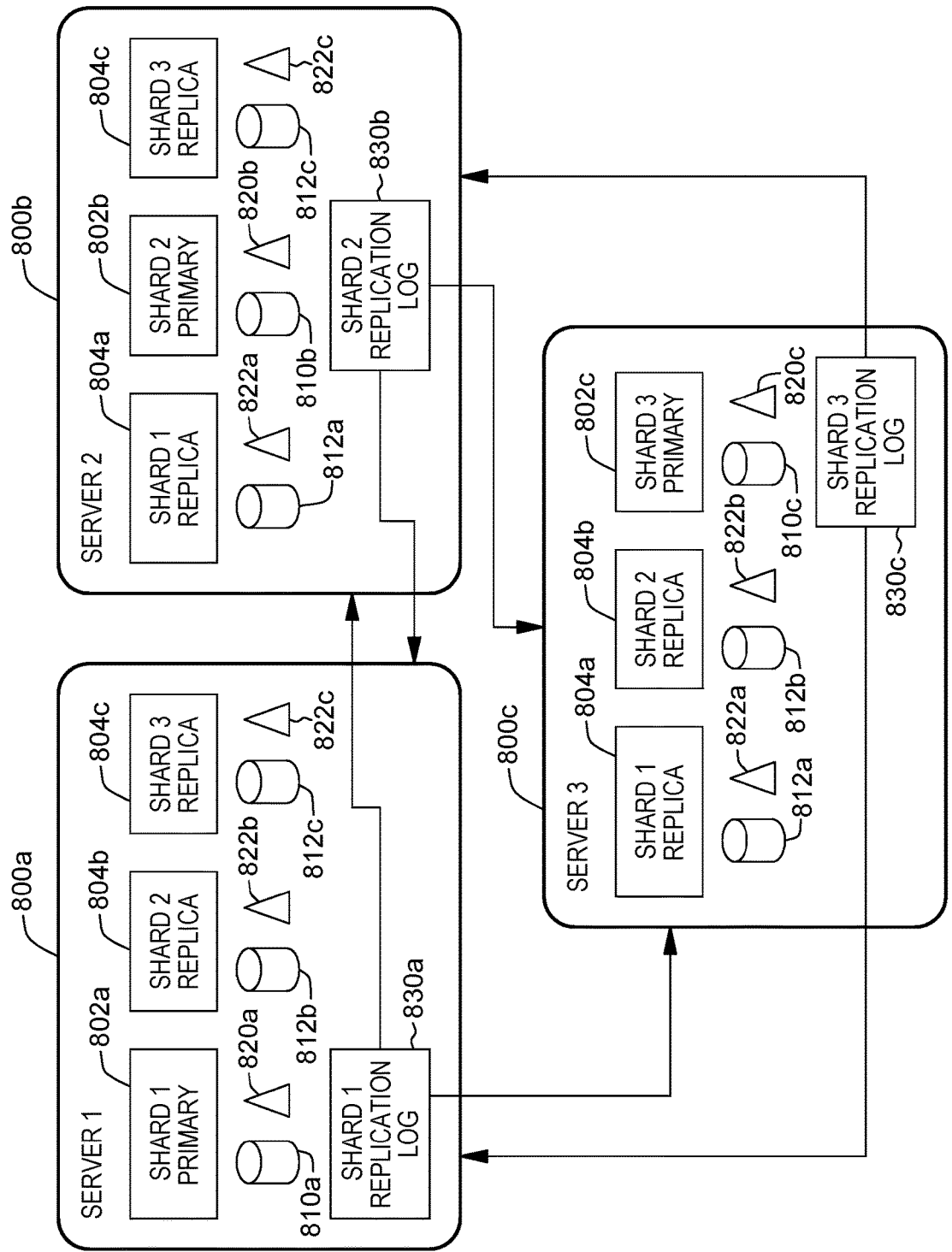
FIG. 8 depicts one example of replicating data and building indexes for each shard, in accordance with one or more aspects of the present invention.
Figure 9:
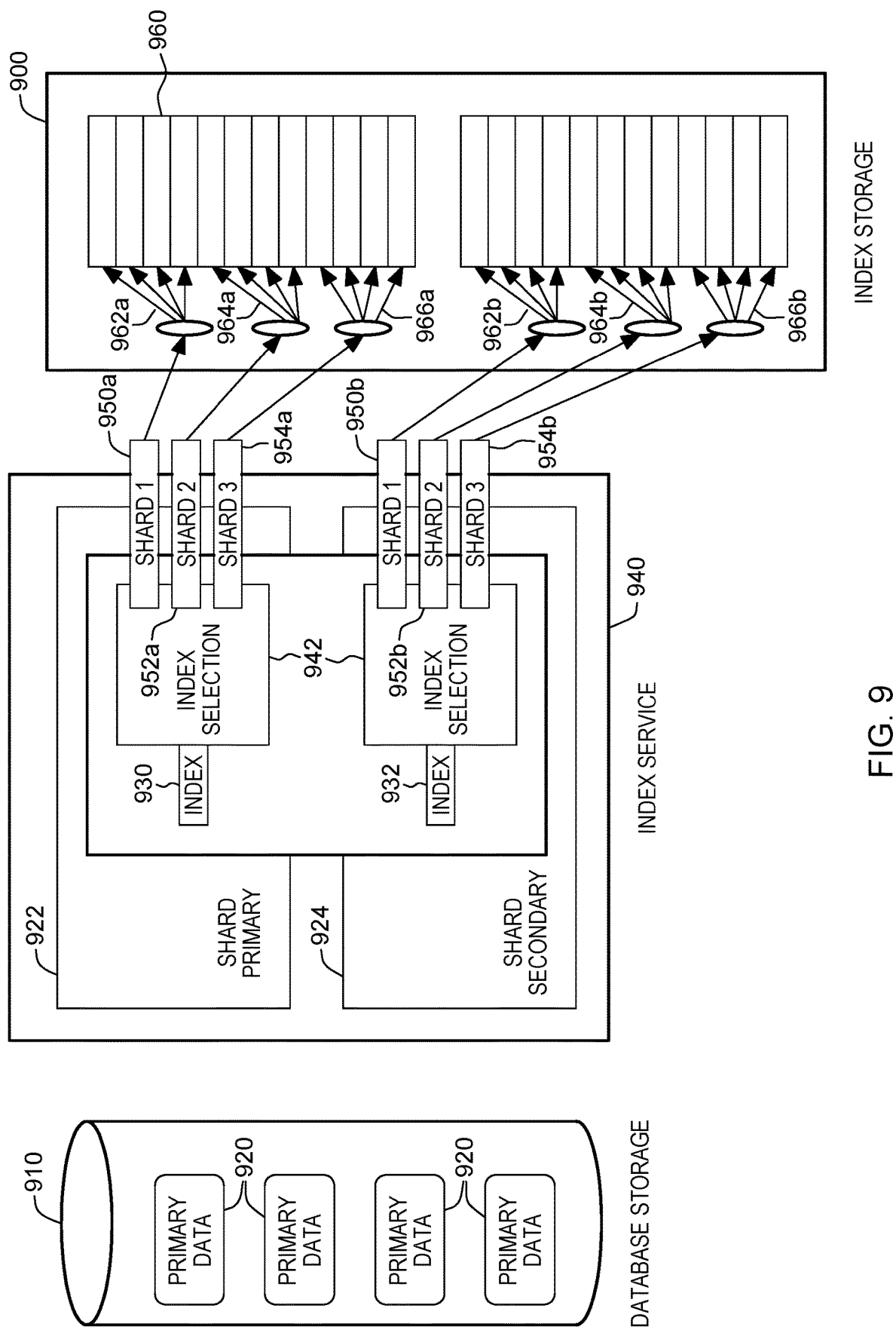
FIG. 9 depicts one example of moving indexes to shared storage, in accordance with one or more aspects of the present invention.
Figure 10:
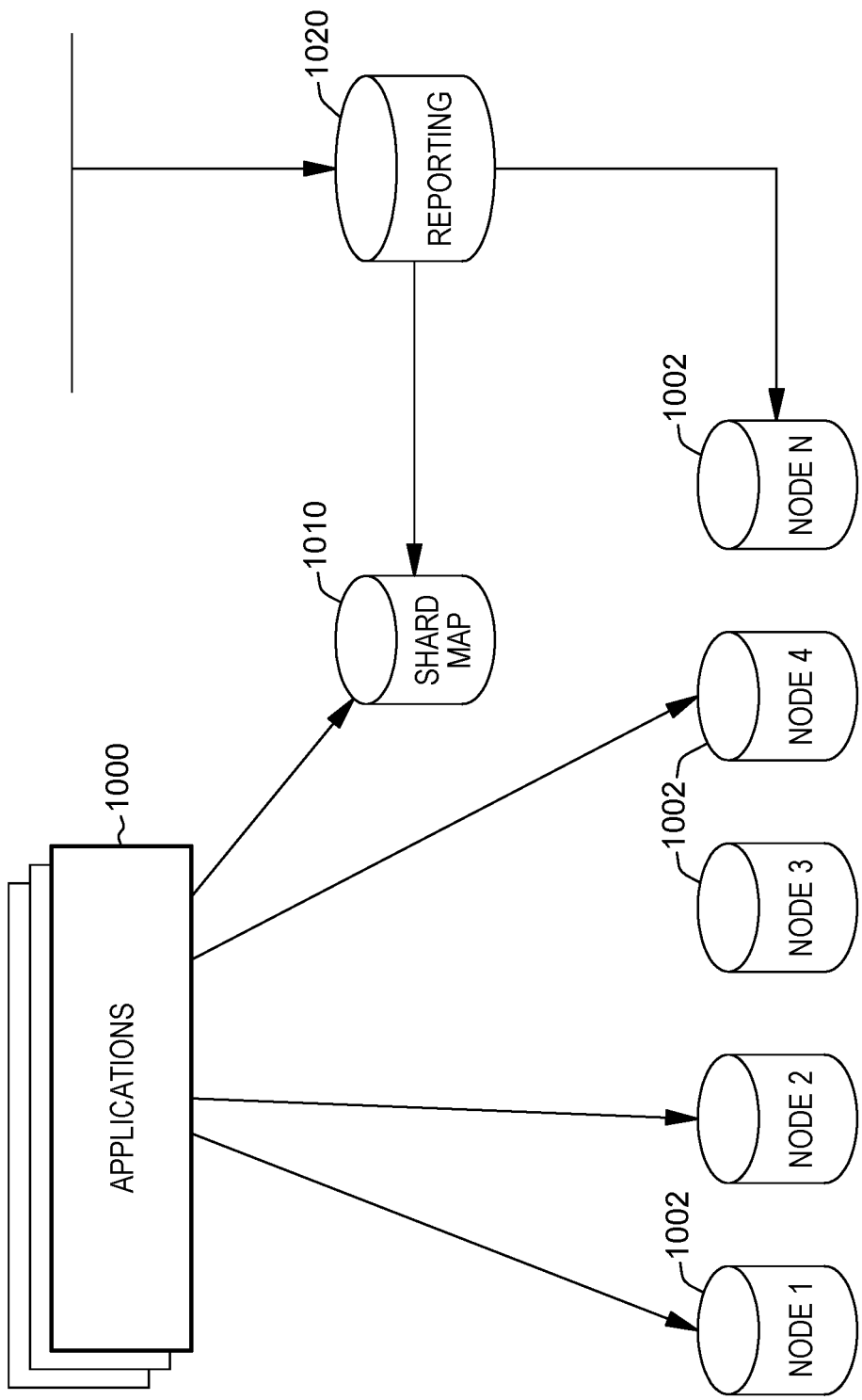
FIG. 10 depicts one example of querying a database, in accordance with one or more aspects of the present invention.
Figure 11:
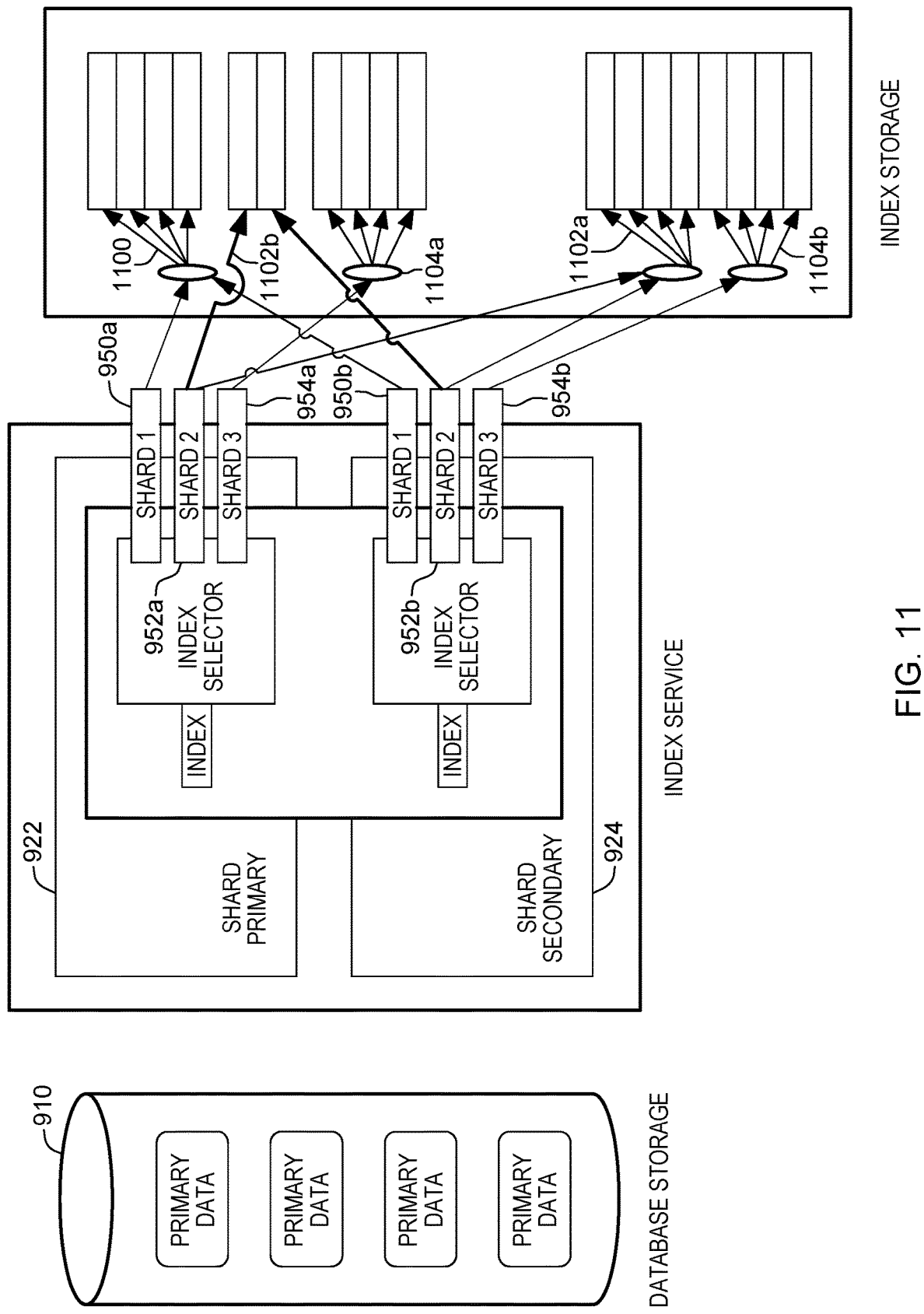
FIG. 11 depicts one example of selectively building indexes for selected shards, in accordance with one or more aspects of the present invention.

Further details of implementing a scalable index are described with reference to FIGS. 6-11. For instance, FIG. 6 depicts one example of replicating primary data among multiple nodes; FIG. 7 depicts one example of updating a log to track database changes and the use of an index; FIG. 8 depicts one example of data and indexes for primary and replica shards;

FIG. 9 depicts one example of shared storage for sets of indexes; FIG. 10 depicts one example of query processing; and FIG. 11 depicts one example of building indexes for selected shards based on, for instance, access frequency and/or access patterns, in accordance with one or more aspects.

Referring initially to FIG. 6, the data of a database is replicated over a plurality of nodes 600a-600c. For instance, the database includes a plurality of primary shards 610a-610c, such as shard 1 primary 610a on node 600a, shard 2 primary 610b on node 600b and shard 3 primary 610c on node 600c. Each primary shard, in this example, has a plurality of replicas. (A primary shard and its replicas is referred to herein as a set of shards or a set of shard copies.) For instance, shard 1 primary 610a has a shard 1 replica 612a on node 600b and a shard 1 replica 612a on node 600c.

Similarly, shard 2 primary 610b has a shard 2 replica 612b on node 600a and a shard 2 replica 612b on node 600c, and shard 3 primary 610c has a shard 3 replica 612c on node 600a and a shard 3 replica 612c on node 600b. Each primary shard of data, in this example, accepts write operations and is the source of truth for its replicas.

To synchronize the data in primary shards 610a-610c and replica shards 612a-612c, log files 614a-614c stored with primary shards 610a-610c are used. Log files 614a-614c include the write operations accepted by primary shards 610a-610c, respectively, in, e.g., sequential order. Each replica shard 612a-612c may read the write operations from logs 614a-614c, respectively, and apply them locally. The log is referred to in this context as a replication log since it is used by the replicas. However, it may be referred to as simply a log, an update log, a transaction log, etc. A log, such as each of logs 614a-614c, records transactions and database modifications by each transaction. If there is a system failure, the log is used to bring the database back to a consistent state. Further details relating to a log are described with reference to FIG. 7.

As shown in FIG. 7, in one example, an update (e.g., write) request 700 is obtained by a request processor 702 (e.g., request processor 320), and request processor 702 records the operation specified in the request in an update log 704. For instance, insert, update and/or delete operations for the database are recorded in update log 704. As an example, update log 704 includes a logical sequence number 715 for each update to the log, and an indication of the operation. As examples, update log 704 includes, a begin Tran1 (Transaction 1) 720, a begin Tran2 722, an update Tran2 724, a checkpoint 726, an update Tran1 728, a commit Tran1 730, a checkpoint 732 and an update Tran2 734, as a few examples.

Additionally, based on the request, request processor 702 generates an update on both primary data 706 and an index 708 to reflect the update. The primary data is further written to each copy (replica) and indexes are built. In one example, indexes are built around the primary data (e.g., the primary and primary replicas). However, in accordance with one or more aspects of the present invention, selected indexes are built rather than an index for the primary and each replica, as described herein.

Further details relating to building indexes, in general, are described with reference to FIG. 8. In one example, each node 800a-800c includes a primary shard 802a-802c, one or more replica shards 804a-804c and a replication log 830a-830b. Primary data 810a-810c in each shard is replicated (e.g., 812a-812c) among multiple nodes 800a-800c. In one example, indexes 820a-820c are built around primary data 810a-810c in each shard, and indexes 822a-822c are built around replica data 812a-812c, providing high availability and using additional storage. However, to reduce storage and processing costs, in one or more aspects, select sets of indexes are built rather than all the sets of indexes, as described herein.

In one aspect, as depicted in FIG. 9, the indexes (e.g., sets of indexes) are moved to a shared index storage 900 separate from a database storage 910 that stores the data, e.g., primary data 920. For a shard in a primary node (e.g., shard primary 922) and (or) a secondary node (e.g., shard secondary 924—replica of shard primary 922), an index 930, 932 is built according to the mapping of the shard distribution. In one example, an index service 940 (e.g., index service 350) is used to build the index(es). For instance, an index selection 942 (e.g., of an index supervisor, such as index supervisor 352) of index service 940 is used to select a shard for which one or more sets of indexes 960 are to be built. In one example, this selection and index building are performed for each shard, and the indexes built for the shards are stored in shared index storage 900.

Thus, as shown in FIG. 9, shared index storage 900 includes a set of indexes 962a for primary shard 1 950a and a set of indexes 962b for secondary shard 1 950b. Each set includes, e.g., a plurality of indexes for a plurality of database records of the shard of a database. The index content is the same for indexes 962b as for 962a, in one example. Further, shared index storage 900 includes a set of indexes 964a for primary shard 2 952a and a set of indexes 964b for secondary shard 2 952b; and a set of indexes 966a for primary shard 3 954a and a set of indexes 966b for secondary shard 3 954b. Again, the indexes built for the copies include the same content as the indexes for the primary data.

As shown, storage is used for each index that is built. Therefore, in one or more aspects, to reduce the use of storage and costs and to facilitate processing, instead of building indexes for each shard copy (or each shard of a set of shards), one or more shard copies (but not all) are selected for which indexes are to be built. In one example, the indexes are built based on access usage (e.g., one or more of data distribution, access frequency, access patterns, access paths, etc.).

Thus, in one or more aspects, a query pattern analyzer (e.g., of query processor 364) is used to analyze the access frequency and/or access path of each kind of query and each primary database. Query pattern relationships are built between nodes and shards. For instance, referring to FIG. 10, an application 1000 accesses one or more shards stored on one or more nodes 1002. A shard map 1010 indicates the shards of a database and the nodes that store the shards. Similarly, other queries (e.g., reporting) may access shard map 1010 and/or one or more nodes 1002. In one example, a specific workload accesses the shards on a plurality of the nodes with the following frequencies:

```
{
workload_uuid: f711ceb
workload_name: "analyze frame"
node1: {
node_id: "node1"
shard_id: "shard1"
...
index_type: "index1",
frequency: "105"
}
node2: {
node_id: "node2"
shard_id: "shard1"
...
index_type: "index1",
frequency: "72"
}
node4: {
node_id: "node4"
shard_id: "shard1"
...
index_type: "index1",
frequency: "20"
}
}
```

In the above example, shard 1 is located on three nodes: node1, node2 and node4. One of the nodes is considered a primary node and the other nodes are consider secondary (replica) nodes. In accordance with one or more aspects of the present invention, one or more sets of indexes is built for shard 1, but not for each shard 1 on each node. Thus, in one aspect, based on, e.g., access frequency, a set of indexes is built for shard 1 on node1, and optionally for shard 1 on node2, but not for shard 1 on node4. The above is only one example; many examples are possible.

In one or more aspects, a set of indexes is built for one or several shard copies (a copy may be the primary shard or a replica shard), rather than all the shard copies. As an example, an index distribution is defined for multiple database nodes and based on predefined selection criteria (e.g., access frequency), one or more sets of indexes are built for one or more selected shard copies. For instance, a set of indexes is built for a shard copy that is frequently accessed, as well as for shard copies with hot access frequencies. Other selection criteria may be used.

The selective building of sets of indexes reduces storage requirements, as shown in FIG. 11. In FIG. 11 (similar to FIG. 9), in one example, there are three primary shards of a database: shards 950a, 952a and 954a; and three replica shards of the database, which are replicas of the primary shards: shard 950b, 952b and 954b. Based, for instance, on access usage (e.g., index distribution and/or access frequency, etc.), the following sets of indexes are built and used by the shards: a set of indexes 1100 is built and used for shard 1 950a, 950b (no separate index is built for shard 1 950b); a set of indexes 1102a is built and used for shard 2 952a, 952b (no separate index is built for shard 2 952a); a set of indexes 1104a is built and used for shard 3 954a; and a set of indexes 1104b is built and used for shard 3 954b. In this example, each shard 3 has its own set of indexes, since it is determined that shard 3 has, e.g., hot access frequencies (based on predefined criteria—e.g., greater than or equal to a threshold; within a range; as compared to other shards; etc.) and thus, redundant index sets improve processing.

Further, in one example, to accommodate skewed data (e.g., data skewed to the left or right providing a long tail), a set of indexes 1102b is built for at least a portion of primary shard 2. In such a case, an index for skewed data can be extended across nodes to allow even distribution (e.g., request may come from multiple nodes).

In one or more aspects, a query request is accepted from one of multiple primary databases and the search is redirected to the replication set in a multiple database set. In one example, the access frequency and/or access path of each kind of query and each primary database is analyzed. Based on the analysis, the index distribution for each shard in a database node is adjusted. An index may be re-balanced according to access usage (e.g., primary data distribution trend, access frequency and/or query patterns, etc.).

As described herein, indexes are built based on, for instance, access usage (e.g., access frequency and/or other access usage criteria). Indexes are not necessarily built for all copies of shards but for selected copies of shards. Thus, the storage and costs for multiple-primary or primary-secondary configurations are reduced; the cost of building redundant indexes is saved; and a resource of scatter and gather can be balanced. Cost savings and flexibility are provided.

Described above is one example of scalable index processing. One or more aspects of the process may use machine learning. For instance, machine learning may be used to learn of access usage (e.g., access frequencies, access patterns), predict access usage, perform analysis and/or perform other tasks. A system is trained to perform analyses and learn from input data and/or choices made.

Figure 12:
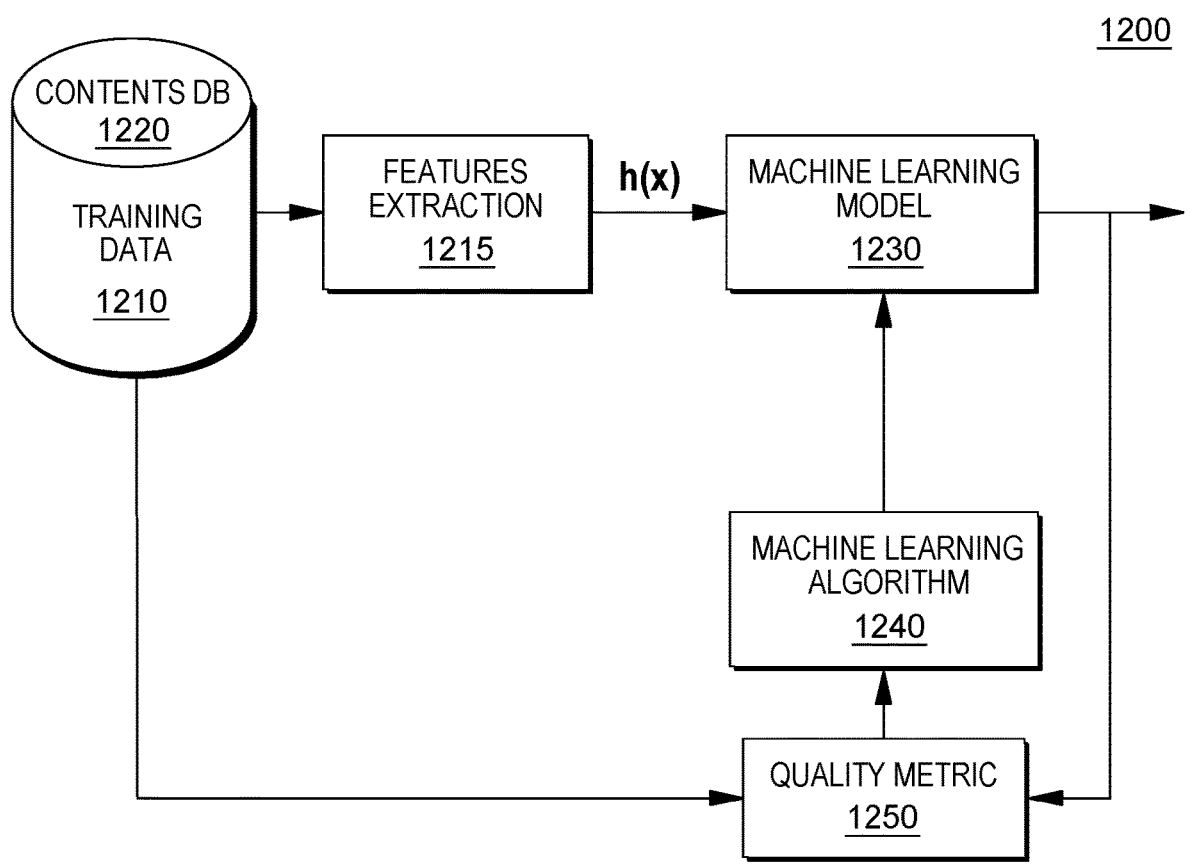
FIG. 12 depicts one example of a machine learning training system used in accordance with one or more aspects of the present invention.

FIG. 12 is one example of a machine learning training system 1200 that may be utilized, in one or more aspects, to perform cognitive analyses of various inputs, including input data, data from one or more data structures and/or other data. Training data utilized to train the model in one or more embodiments of the present invention includes, for instance, data that pertains to one or more events, such as queries, usage frequency, usage patterns, etc. The program code in embodiments of the present invention performs a cognitive analysis to generate one or more training data structures, including algorithms utilized by the program code to predict states of a given event. Machine learning (ML) solves problems that are not solved with numerical means alone. In this ML-based example, program code extracts various attributes from ML training data 1210 (e.g., historical data collected from various data sources relevant to the event), which may be resident in one or more databases 1220 comprising event or task-related data and general data. Attributes 1215 are utilized to develop a predictor function, h(x), also referred to as a hypothesis, which the program code utilizes as a machine learning model 1230.

In identifying various event states, features, constraints and/or behaviors indicative of states in the ML training data 1210, the program code can utilize various techniques to identify attributes in an embodiment of the present invention. Embodiments of the present invention utilize varying techniques to select attributes (elements, patterns, features, constraints, etc.), including but not limited to, diffusion mapping, principal component analysis, recursive feature elimination (a brute force approach to selecting attributes), and/or a Random Forest, to select the attributes related to various events. The program code may utilize a machine learning algorithm 1240 to train the machine learning model 1230 (e.g., the algorithms utilized by the program code), including providing weights for the conclusions, so that the program code can train the predictor functions that comprise the machine learning model 1230. The conclusions may be evaluated by a quality metric 1250. By selecting a diverse set of ML training data 1210, the program code trains the machine learning model 1230 to identify and weight various attributes (e.g., features, patterns, constraints) that correlate to various states of an event.

The model generated by the program code is self-learning as the program code updates the model based on active event feedback, as well as from the feedback received from data related to the event. For example, when the program code determines that there is a constraint, event or pattern (e.g., usage frequency, usage pattern) that was not previously predicted by the model, the program code utilizes a learning agent to update the model to reflect the state of the event, in order to improve predictions in the future. Additionally, when the program code determines that a prediction is incorrect, either based on receiving user feedback through an interface or based on monitoring related to the event, the program code updates the model to reflect the inaccuracy of the prediction for the given period of time. Program code comprising a learning agent cognitively analyzes the data deviating from the modeled expectations and adjusts the model to increase the accuracy of the model, moving forward.

In one or more embodiments, program code, executing on one or more processors, utilizes an existing cognitive analysis tool or agent (now known or later developed) to tune the model, based on data obtained from one or more data sources. In one or more embodiments, the program code interfaces with application programming interfaces to perform a cognitive analysis of obtained data. Specifically, in one or more embodiments, certain application programming interfaces comprise a cognitive agent (e.g., learning agent) that includes one or more programs, including, but not limited to, natural language classifiers, a retrieve and rank service that can surface the most relevant information from a collection of documents, concepts/visual insights, trade off analytics, document conversion, and/or relationship extraction. In an embodiment, one or more programs analyze the data obtained by the program code across various sources utilizing one or more of a natural language classifier, retrieve and rank application programming interfaces, and trade off analytics application programming interfaces. An application programming interface can also provide audio related application programming interface services, in the event that the collected data includes audio, which can be utilized by the program code, including but not limited to natural language processing, text to speech capabilities, and/or translation.

In one or more embodiments, the program code utilizes a neural network to analyze event-related data to generate the model utilized to predict the state of a given event at a given time. Neural networks are a biologically-inspired programming paradigm which enable a computer to learn and solve artificial intelligence problems. This learning is referred to as deep learning, which is a subset of machine learning, an aspect of artificial intelligence, and includes a set of techniques for learning in neural networks. Neural networks, including modular neural networks, are capable of pattern recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in multiple source processing, which the program code in one or more embodiments accomplishes when obtaining data and generating a model for predicting states of a given event.

One or more aspects of the present invention are tied to computer technology and facilitate processing within a computer, improving performance thereof. For instance, storage requirements and costs are reduced, along with processing time and resources to implement indexes. Processing within a processor, computer system and/or computing environment is improved.

Other aspects, variations and/or embodiments are possible.

The computing environments described herein are only examples of computing environments that can be used. One or more aspects of the present invention may be used with many types of environments. The computing environments provided herein are only examples. Each computing environment is capable of being configured to include one or more aspects of the present invention. For instance, each may be configured to implement scalable indexes and/or to perform one or more other aspects of the present invention.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other replication techniques and/or other selection criteria may be used. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:
   determining access usage of one or more shards of a set of shards of a database, wherein the set of shards includes a plurality of shards including a primary shard and one or more replica shards of the primary shard;

selecting a shard of the set of shards for which a set of indexes is to be built, the selecting the shard of the set of shards for which the set of indexes is to be built being based on the access usage, and wherein the set of indexes includes one or more indexes for one or more database records of the shard that is selected, the shard that is selected being one shard of the primary shard and a replica shard of the one or more replica shards, wherein the selecting includes selecting fewer than all shards of the set of shards for index building such that at least one shard of the set of shards is not selected for index building;

building the set of indexes for the shard that is selected, wherein building of a separate set of indexes for the at least one shard that is not selected is omitted, and wherein the set of indexes built for the shard that is selected is to be used to access the one or more database records of the shard that is selected and one or more corresponding database records of another shard of the set of shards, the another shard being the other shard of the primary shard and the replica shard, and the one or more corresponding database records corresponding to the one or more database records; and accessing an index of the set of indexes built for the shard that is selected, the index to be used, at least, to access a corresponding database record of the one or more corresponding database records of the another shard, wherein the at least one shard for which index building was omitted includes the another shard of the set of shards.

2. The computer-implemented method of claim 1, wherein the set of indexes is stored in shared index storage separate from database storage.

3. The computer-implemented method of claim 1, wherein the selecting the shard based on the access usage includes:

determining that an access frequency of the shard has a predefined relationship with a threshold; and selecting the shard based on determining that the access frequency has the predefined relationship with the threshold.

4. The computer-implemented method of claim 3, wherein the predefined relationship with the threshold is at least equal to the threshold, wherein the access frequency is at least equal to the threshold.

5. The computer-implemented method of claim 3, wherein the predefined relationship with the threshold is being within a predefined threshold range, wherein the access frequency is within the predefined threshold range.

6. The computer-implemented method of claim 1, wherein the selecting the shard based on the access usage includes:

determining access frequencies of the plurality of shards;

comparing the access frequencies of the plurality of shards; and selecting, based on the comparing, the shard of the plurality of shards that has a higher access frequency compared to the access frequencies of other shards of the plurality of shards.

7. The computer-implemented method of claim 1, further comprising:

selecting, based on one or more selection criteria, one or more additional shards of the plurality of shards for which one or more sets of indexes are to be built, the one or more additional shards being fewer than the plurality of shards; and building the one or more sets of indexes for the one or more additional shards that are selected.

8. The computer-implemented method of claim 1, further comprising:

determining that a particular shard of the plurality of shards includes skewed data; and building at least one set of indexes for at least a portion of the particular shard that includes the skewed data.

9. The computer-implemented method of claim 1, further comprising:

analyzing query requests for the database; and adjusting an index distribution for one or more shards of the plurality of shards, based on an analysis of the query requests.

10. A computer system for dynamic processing within a computing environment, the computer system comprising:

a memory; and one or more processors in communication with the memory, wherein the computer system is configured to perform a method, said method comprising:

determining access usage of one or more shards of a set of shards of a database, wherein the set of shards includes a plurality of shards including a primary shard and one or more replica shards of the primary shard;

selecting a shard of the set of shards for which a set of indexes is to be built, the selecting the shard of the set of shards for which the set of indexes is to be built being based on the access usage, and wherein the set of indexes includes one or more indexes for one or more database records of the shard that is selected, the shard that is selected being one shard of the primary shard and a replica shard of the one or more replica shards, wherein the selecting includes selecting fewer than all shards of the set of shards for index building such that at least one shard of the set of shards is not selected for index building;

building the set of indexes for the shard that is selected, wherein building of a separate set of indexes for the at least one shard that is not selected is omitted, and wherein the set of indexes built for the shard that is selected is to be used to access the one or more database records of the shard that is selected and one or more corresponding database records of another shard of the set of shards, the another shard being the other shard of the primary shard and the replica shard, and the one or more corresponding database records corresponding to the one or more database records; and accessing an index of the set of indexes built for the shard that is selected, the index to be used, at least, to access a corresponding database record of the one or more corresponding database records of the another shard, wherein the at least one shard for which index building was omitted includes the another shard of the set of shards.

11. The computer system of claim 10, wherein the selecting the shard based on the access usage includes:

determining that an access frequency of the shard has a predefined relationship with a threshold; and selecting the shard based on determining that the access frequency has the predefined relationship with the threshold.

12. The computer system of claim 10, wherein the selecting the shard based on the access usage includes:

determining access frequencies of the plurality of shards;

comparing the access frequencies of the plurality of shards; and selecting, based on the comparing, the shard of the plurality of shards that has a higher access frequency compared to the access frequencies of other shards of the plurality of shards.

13. The computer system of claim 10, wherein the method further comprises:

selecting, based on one or more selection criteria, one or more additional shards of the plurality of shards for which one or more sets of indexes are to be built, the one or more additional shards being fewer than the plurality of shards; and building the one or more sets of indexes for the one or more additional shards that are selected.

14. The computer system of claim 10, wherein the method further comprises:

determining that a particular shard of the plurality of shards includes skewed data; and building at least one set of indexes for at least a portion of the particular shard that includes the skewed data.

15. A computer program product for dynamic processing within a computing environment, said computer program product comprising:

one or more computer readable storage media and program instructions collectively stored on the one or more computer readable storage media readable by at least one processing circuit to perform a method comprising:

determining access usage of one or more shards of a set of shards of a database, wherein the set of shards includes a plurality of shards including a primary shard and one or more replica shards of the primary shard;

selecting a shard of the set of shards for which a set of indexes is to be built, the selecting the shard of the set of shards for which the set of indexes is to be built being based on the access usage, and wherein the set of indexes includes one or more indexes for one or more database records of the shard that is selected, the shard that is selected being one shard of the primary shard and a replica shard of the one or more replica shards, wherein the selecting includes selecting fewer than all shards of the set of shards for index building such that at least one shard of the set of shards is not selected for index building;

building the set of indexes for the shard that is selected, wherein building of a separate set of indexes for the at least one shard that is not selected is omitted, and wherein the set of indexes built for the shard that is selected is to be used to access the one or more database records of the shard that is selected and one or more corresponding database records of another shard of the set of shards, the another shard being the other shard of the primary shard and the replica shard, and the one or more corresponding database records corresponding to the one or more database records; and accessing an index of the set of indexes built for the shard that is selected, the index to be used, at least, to access a corresponding database record of the one or more corresponding database records of the another shard, wherein the at least one shard for which index building was omitted includes the another shard of the set of shards.

16. The computer program product of claim 15, wherein the selecting the shard based on the access usage includes:

determining that an access frequency of the shard has a predefined relationship with a threshold; and selecting the shard based on determining that the access frequency has the predefined relationship with the threshold.

17. The computer program product of claim 15, wherein the selecting the shard based on the access usage includes:

determining access frequencies of the plurality of shards;

comparing the access frequencies of the plurality of shards; and selecting, based on the comparing, the shard of the plurality of shards that has a higher access frequency compared to the access frequencies of other shards of the plurality of shards.

18. The computer program product of claim 15, wherein the method further comprises:

selecting, based on one or more selection criteria, one or more additional shards of the plurality of shards for which one or more sets of indexes are to be built, the one or more additional shards being fewer than the plurality of shards; and building the one or more sets of indexes for the one or more additional shards that are selected.

19. The computer program product of claim 15, wherein the method further comprises:

determining that a particular shard of the plurality of shards includes skewed data; and building at least one set of indexes for at least a portion of the particular shard that includes the skewed data.

* * * * *